United States Patent
Hasebe et al.

(10) Patent No.: US 9,672,088 B2
(45) Date of Patent: Jun. 6, 2017

(54) HARDWARE DEVICE CONTROLLER, IMAGE FORMING APPARATUS, AND CONTROL METHOD

(71) Applicants: Ryohya Hasebe, Kanagawa (JP); Hiroyuki Iwasaki, Kanagawa (JP)

(72) Inventors: Ryohya Hasebe, Kanagawa (JP); Hiroyuki Iwasaki, Kanagawa (JP)

(73) Assignee: RICOH COMPANY, LIMITED, Tokyo (JP)

(\*) Notice: Subject to any disclaimer, the term of this patent is extended or adjusted under 35 U.S.C. 154(b) by 0 days.

(21) Appl. No.: 14/828,793

(22) Filed: Aug. 18, 2015

(65) Prior Publication Data
US 2016/0055050 A1  Feb. 25, 2016

(30) Foreign Application Priority Data

Aug. 19, 2014 (JP) ................................. 2014-166734
Aug. 10, 2015 (JP) ................................. 2015-158471

(51) Int. Cl.
*G06F 11/00* (2006.01)
*G06F 11/07* (2006.01)
*G06F 13/00* (2006.01)

(52) U.S. Cl.
CPC ...... *G06F 11/0757* (2013.01); *G06F 11/0733* (2013.01); *G06F 13/00* (2013.01)

(58) Field of Classification Search
USPC .......................................................... 714/55
See application file for complete search history.

(56) References Cited

U.S. PATENT DOCUMENTS 5,441,027 A     8/1995  Buchanon et al.
2013/0141750 A1\* 6/2013 Suzuki ................. G06K 15/408
                                          358/1.14

FOREIGN PATENT DOCUMENTS

JP  H07-049055   2/1995
JP  2011-056852  3/2011

\* cited by examiner

*Primary Examiner* — Sarai Butler
(74) *Attorney, Agent, or Firm* — Harness, Dickey & Pierce, P.L.C.

(57) ABSTRACT

A hardware device controller includes a controlling unit, a relay unit, and a watchdog timer. The controlling unit outputs a control signal to control a hardware device. The relay unit outputs, on the basis of the control signal, a control signal to the hardware device. When not receiving a first signal output from the controlling unit via the relay unit for a predetermined length of time or longer, the watchdog timer outputs a second signal. When the second signal is output, the controlling unit and the relay unit perform initialization process, and the hardware device stops driving.

15 Claims, 4 Drawing Sheets

HARDWARE DEVICE CONTROLLER, IMAGE FORMING APPARATUS, AND CONTROL METHOD

CROSS-REFERENCE TO RELATED APPLICATIONS

The present application claims priority to and incorporates by reference the entire contents of Japanese Patent Application No. 2014-166734 filed in Japan on Aug. 19, 2014 and Japanese Patent Application No. 2015-158471 filed in Japan on Aug. 10, 2015.

BACKGROUND OF THE INVENTION

1. Field of the Invention

The present invention relates to a hardware device controller, an image forming apparatus, and a control method.

2. Description of the Related Art

Conventionally, when an abnormality occurs in a CPU of an information processing apparatus and a motor driving apparatus having a plurality of controlling units, the data and apparatuses are protected by forcibly stopping the control signals and the supply of power. Configurations having a watchdog timer have been used widely to detect such an abnormality in the CPU, and by causing the watchdog timer to monitor a clear signal transmitted from the CPU, the power supply is cut off when an abnormality occurs in the CPU. In this manner, a configuration that enhances the protectiveness of a device by causing a watchdog timer to monitor a runaway of software in a CPU has been known.

Japanese Patent Application Laid-open No. 2011-56852, for example, discloses a technology in which a watchdog timer monitors an abnormality in a hardware device controlled by a CPU, and when an abnormality occurs, stops a load such as a motor.

However, in the conventional technologies as described above, when an abnormality occurs in a relay unit such as an I/O expander connected to a controlling unit (CPU), an abnormality in a hardware device cannot be monitored accurately. Accordingly, the hardware device cannot be stopped accurately at the time of the occurrence of abnormality.

Therefore, there is a need to accurately monitor an abnormality in a relay unit such as an I/O expander connected to a controlling unit (CPU) and to accurately stop a hardware device in the case of the occurrence of abnormality.

SUMMARY OF THE INVENTION

It is an object of the present invention to at least partially solve the problems in the conventional technology.

A hardware device controller includes a controlling unit, a relay unit, and a watchdog timer. The controlling unit outputs a control signal to control a hardware device. The relay unit outputs, on the basis of the control signal, a control signal to the hardware device. When not receiving a first signal output from the controlling unit via the relay unit for a predetermined length of time or longer, the watchdog timer outputs a second signal. When the second signal is output, the controlling unit and the relay unit perform initialization process, and the hardware device stops driving.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of a hardware device controller, an image forming apparatus, and a control method according to the present invention will be described below in greater detail with reference to the accompanying drawings.

Figure 5:
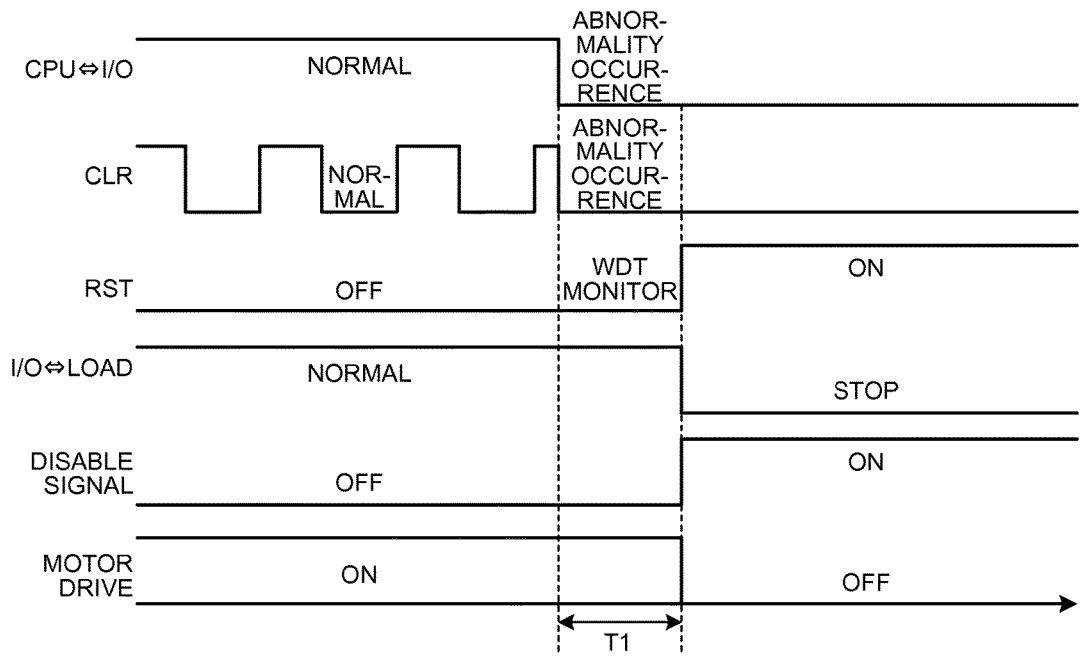
FIG. 5 is a timing chart illustrating a state of a conventional motor driving apparatus in the case of the occurrence of abnormality.

The operation of a conventional motor driving apparatus in the case of the occurrence of abnormality will now be described. FIG. 5 is a timing chart illustrating a state of the conventional motor driving apparatus in the case of the occurrence of abnormality. In the chart, a clear signal is abbreviated to CLR, a reset signal is abbreviated to RST, an I/O expander is abbreviated to I/O, and a hardware device is referred to as a load. A conventional apparatus that uses a watchdog timer (WDT) to stop driving the motor in the case of the occurrence of abnormality causes a CPU to directly transmit a clear signal to the watchdog timer. When the CPU can no longer transmit a control signal to an I/O expander at the time of runaway of software or the like, the clear signal is also not transmitted to the watchdog timer. In this case, the watchdog timer, which can no longer receive the clear signal, transmits a reset signal so as to cause the CPU to be initialized and also stop driving the motor.

Figure 6:
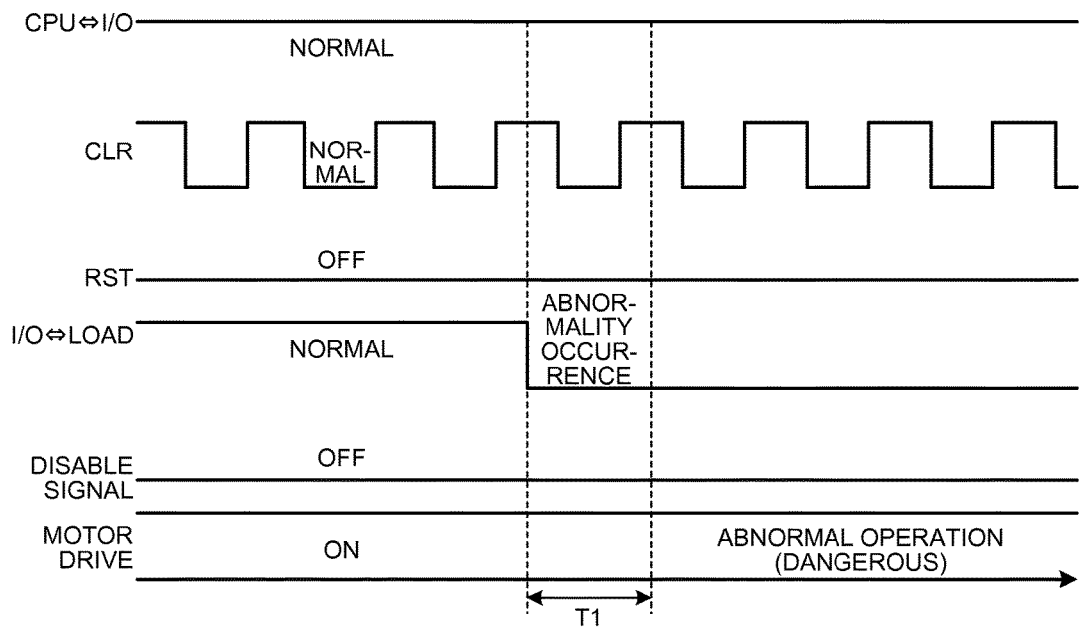
FIG. 6 is a timing chart illustrating a state of a conventional motor driving apparatus in the case of the occurrence of abnormality other than a runaway of software.

However, in such case, it is understood that the signal transmitted from the I/O expander to the load is not being monitored. FIG. 6 will explain the resulting problems.

FIG. 6 is a timing chart illustrating a state of a conventional motor driving apparatus in the case of the occurrence of abnormality other than a runaway of software. As described above, in the conventional configuration, the protectiveness of the apparatus is enhanced by monitoring a runaway of software in the CPU and stopping driving the motor. However, as illustrated in FIG. 6, when the CPU works normally and the communication between the CPU and the I/O expander is normal at the same time, the watchdog timer receives a clear signal from the CPU. Accordingly, the watchdog timer judges that if the CPU operates normally, a system is safe. When a control signal from the I/O expander to the load is not transmitted normally due to a bus error, external noise, and the like, other than a runaway of software in the CPU, a correct control signal is not transmitted to the load; nevertheless, the watchdog timer cannot detect abnormality. This causes the motor to continue operating in unintended state as a system, which causes the apparatus to be in a dangerous state.

The present embodiment solves the above problems and enhances the protectiveness of the apparatus by the employing the configuration and operation described below.

Figure 1:
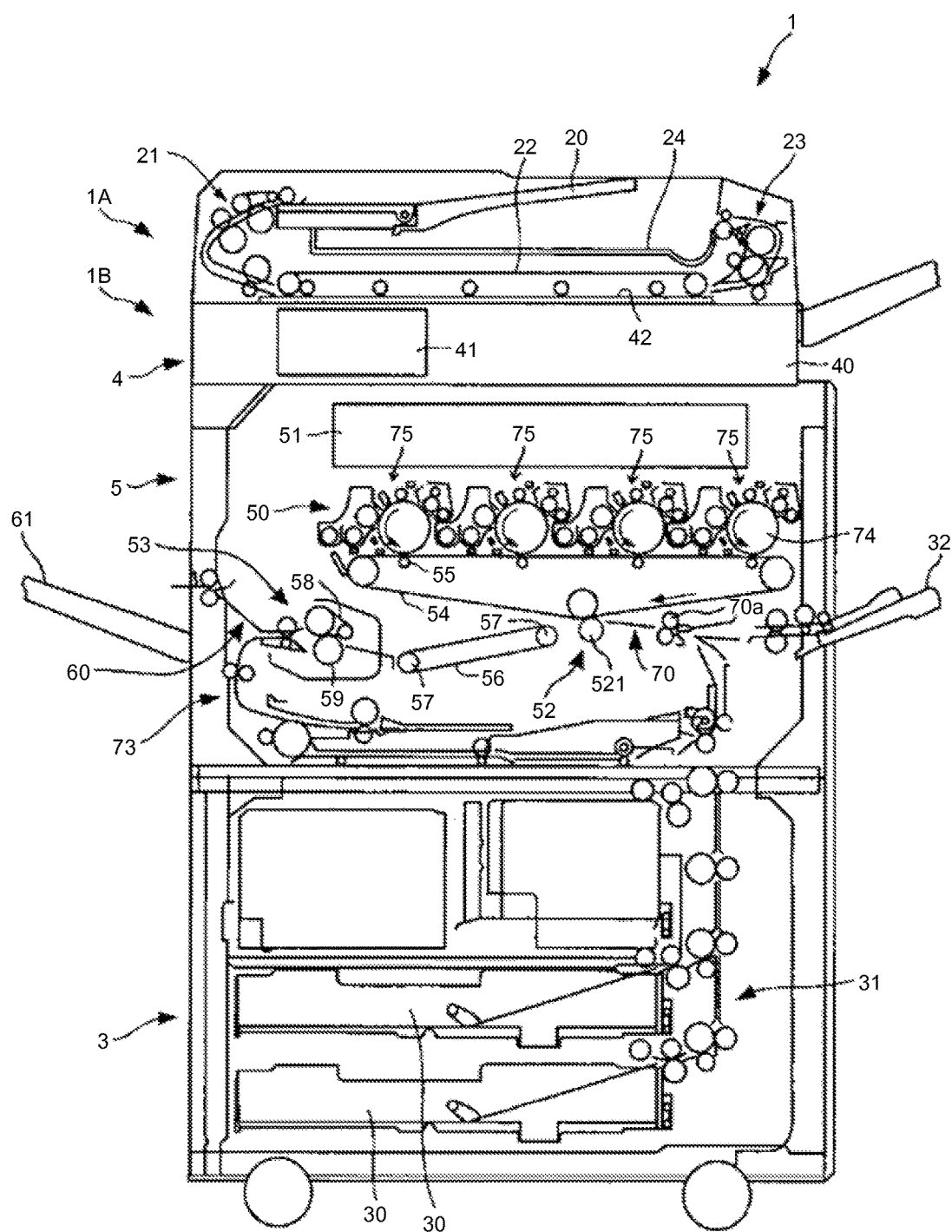
FIG. 1 is a schematic configuration of an image forming apparatus according to an embodiment.

An image forming apparatus including a motor driving apparatus will now be described as an example. FIG. 1, is a schematic configuration of an image forming apparatus 1 according to an embodiment. As illustrated in FIG. 1, the image forming apparatus 1 includes an auto document feeder (ADF) 1A and an apparatus main body 1B. The apparatus main body 1B includes a paper feeding unit 3, an image reading unit 4, and an image forming unit 5.

The ADF 1A includes a paper tray 20, a paper feeding roller 21, a paper conveyance belt 22, a paper ejection roller 23, and a paper ejection tray 24. The ADF 1A is mounted operably and closeably to the image reading unit 4 with an opening/closing mechanism such as a hinge (not illustrated).

The paper feeding roller 21 separates a sheet of paper one by one from a bundle of papers (not illustrated) placed on the paper tray 20, and conveys the paper toward the image reading unit 4. The paper conveyance belt 22 conveys the paper separated by the paper feeding roller 21 to the image reading unit 4. The paper ejection roller 23 ejects the paper received from the image reading unit 4 with the paper conveyance belt 22 to the paper ejection tray 24 located below the paper tray 20.

The image reading unit 4 includes a housing 40, a scanning optical unit 41, a contact glass 42, and a driving unit (not illustrated). The scanning optical unit 41 is provided inside the housing 40 and includes an LED unit. The scanning optical unit 41 emits light from the LED unit in the main-scanning direction while causing the driving unit to perform scanning within the entire irradiated area in the sub-scanning direction. This enables the scanning optical unit 41 to read a two-dimensional color image on the paper.

The contact glass 42 is mounted at the upper side of the housing 40 of the image reading unit 4, and forms the upper surface of the housing 40. The driving unit includes a wire, which is not illustrated, fixed to the scanning optical unit 41, a plurality of driven pulleys (not illustrated) and drive pulleys (not illustrated) cross-linked by the wire, and a motor to rotate the drive pulleys.

The paper feeding unit 3 includes a paper feeding cassette 30 and a paper feeding unit 31. The paper feeding cassette 30 houses sheets of paper (not illustrated) in different sizes as recording media. The paper feeding unit 31 conveys the paper housed in the paper feeding cassette 30 to a main conveyance path 70 in the image forming unit 5.

A manual feed tray 32 is provided for the side surface of the image forming unit 5 operably and closeably to the image forming unit 5, and a bundle of papers is manually fed on the upper surface of the tray with the tray opened to the image forming unit 5. The top sheet of the bundle of manually fed papers is sent toward the main conveyance path 70 by a sending roller of the manual feed tray 32.

The main conveyance path 70 includes a pair of resist rollers 70a. The pair of resist rollers 70a nips the sheet of paper conveyed through the main conveyance path 70 between the rollers and sends the paper toward a secondary transfer nip at a certain timing.

The image forming unit 5 includes an exposure unit 51, a tandem image formation unit 50, an intermediate transfer belt 54, intermediate transfer rollers 55, a secondary transfer device 52, a fixing unit 53, and the like. The image forming unit 5 further includes the main conveyance path 70, a reverse conveyance path 73, a paper ejection path 60, and the like.

As illustrated in FIG. 1, the exposure unit 51 placed adjacent to the tandem image formation unit 50. The exposure unit 51 performs exposure on each photoconductor drum 74 provided corresponding to the color of yellow, cyan, magenta, or black.

The tandem image formation unit 50 is provided above the intermediate transfer belt 54, and made of four image formation units 75 of yellow, cyan, magenta, and black disposed along the rotating direction of the intermediate transfer belt 54. Although a detailed illustration is omitted, each of the image formation units 75 includes a charger, a developing device, a photoconductor cleaning device, a neutralizing device, and the like around the respective photoconductor drums 74 provided corresponding to the colors described above. Each photoconductor drum 74 and the devices described above provided around the photoconductor drum 74 form a unit so as to configure a single process cartridge.

The tandem image formation unit 50 forms a visible image (toner image) on each of the photoconductor drums 74 with the corresponding color of toner based on information of an image read by the image reading unit 4 and separated by each color. The visible image formed on each of the photoconductor drums 74 is transferred onto the intermediate transfer belt 54 between the photoconductor drums 74 and the intermediate transfer rollers 55.

The secondary transfer device 52 is disposed at the opposite side of the tandem image formation unit 50 with the intermediate transfer belt 54 interposed therebetween. The secondary transfer device 52 includes a secondary transfer roller 521 as a transfer member. A secondary transfer nip is formed by pressing the secondary transfer roller 521 against the intermediate transfer belt 54. This secondary transfer nip is configured such that the toner image on the intermediate transfer belt 54 is transferred onto the paper conveyed from the paper feeding unit 3 through the main conveyance path 70.

The paper onto which the toner image is transferred at the secondary transfer nip is sent to the fixing unit 53 with a paper conveyance belt 56 stretched between two supporting rollers 57.

The fixing unit 53 is configured by pressing a pressure roller 59 against a fixing belt 58 that is an endless belt. By applying heat and pressure to the paper with the pressure roller 59, the fixing unit 53 melts the toner of the image transferred onto the paper with the toner, and fixes the image as a color image on the paper.

The paper on which the color image is fixed in this manner is stacked onto a paper ejection tray 61 provided outside the machine via the paper ejection path 60 that is an ejected paper conveyance path.

As illustrated in FIG. 1, the reverse conveyance path 73 is provided below the secondary transfer device 52 and the fixing unit 53. The reverse conveyance path 73, in order to provide images on both sides of the paper, reverses the paper ejected from the fixing unit 53, and supplies the paper once again to the secondary transfer device 52 through the main conveyance path 70.

A plurality of paper detection sensors (not illustrated) as means for detecting paper jams is disposed along the conveyance path of the main conveyance path 70 and the reverse conveyance path 73. The number of the paper detection sensors and their locations are set as appropriate. If the paper detection sensors each do not detect the passing of paper within a certain time, the sensors recognize that a paper jam has occurred, and inform the occurrence of the paper jam to a display unit (not illustrated) and the like of the image forming apparatus 1.

The image forming apparatus 1 configured as above includes motors that are required to rotate at a constant speed in order to provide an appropriate image, such as a motor to drive the photoconductor drums 74, a motor to drive the intermediate transfer belt 54, and a motor to drive the paper conveyance belt 56. The image forming apparatus 1 further includes a motor driving apparatus that drives and controls the motors used to provide an image so that they rotate at a constant speed by feedback control. A motor driving apparatus 100 provided in the image forming apparatus 1 according to an embodiment will now be described as a specific example.

Figure 2:
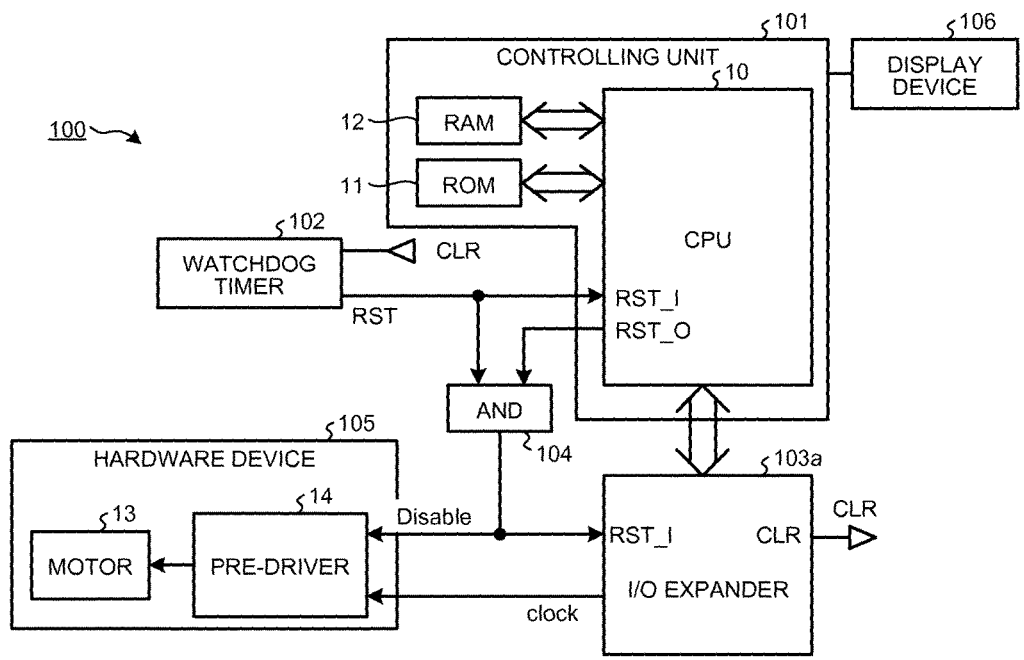
FIG. 2 is a functional block diagram of the main configuration of a motor driving apparatus according to the embodiment.

FIG. 2 is a functional block diagram of the main configuration of the motor driving apparatus 100 according to the embodiment. The motor driving apparatus 100 includes a controlling unit 101, a watchdog timer 102, an I/O expander 103*a*, an AND circuit 104, a hardware device 105, and a display device 106.

The hardware device 105, for example, may be a motor 13 used as a driving source such as a main driving unit and a transfer driving unit of an image forming apparatus. The image forming apparatus may be an electrophotographic copying machine or printer, or an ink jet printer, for example. The motor 13 may be any of a stepping motor, a DC motor, and the like. The display device 106 includes a display unit such as a liquid crystal panel, for example, and visually displays certain display information supplied from the controlling unit 101. As described above, the motor 13 may be a motor to drive the photoconductor drums 74, a motor to drive the intermediate transfer belt 54, a motor to drive the paper conveyance belt 56, and the like.

The controlling unit 101 is a microcomputer system. In other words, the controlling unit 101 includes a central processing unit (CPU) 10, a read only memory (ROM) 11, a random access memory (RAM) 12, and the like. In the present example, the hardware device 105 includes the motor 13 and a pre-driver 14. The ROM 11 stores therein a control program of the CPU 10. The RAM 12 is used as a working memory and the like during the control with the CPU 10.

All or a part of functions of the controlling unit 101 may be configured with hardware. In the diagram, a clear signal is abbreviated to CLR (corresponding to a first signal) and a reset signal is abbreviated to RST (corresponding to a second signal).

The controlling unit 101 outputs a control signal to control the hardware device 105. The I/O expander 103*a* serving as a relay unit outputs, on the basis of the control signal, a control signal to the hardware device 105 (pre-driver 14). The watchdog timer 102 receives a clear signal (described as "CLR" in FIG. 4) output from the controlling unit 101 via the I/O expander 103*a* at regular intervals.

When an abnormality of not being able to receive a clear signal at regular intervals is detected, the watchdog timer 102 transmits a reset signal to the controlling unit 101, causes the I/O expander 103*a* to be initialized, and outputs a signal to stop driving the hardware device 105. The watchdog timer 102 may receive a signal within a certain time range (timer) in which overflow does not occur, and does not need to receive the signal at regular intervals.

The AND circuit 104 receives the RST (the second signal) from the watchdog timer 102 and an RST_0 (a third signal) from the controlling unit 101, and outputs a fourth signal by logical conjunction. In this manner, the AND circuit 104 ensures a reset sequence while the power is turned on, and resets the CPU 10, the motor 13, and the I/O expander 103*a* when the watchdog timer 102 transmits the RST. A configuration in which the AND circuit 104 is not provided may be employed.

The motor driving apparatus 100 illustrated in FIG. 2 will further be described in detail. The CPU 10 transmits an instruction to drive and control the motor. The I/O expander 103*a* transmits a signal from the CPU 10 to each load (pre-driver 14 in the present example). The watchdog timer 102 receives a clear signal transmitted from the CPU 10 via the I/O expander 103*a*. The pre-driver 14 converts the signal received from the I/O expander 103*a* to a signal for driving and controlling the motor 13.

The I/O expander 103*a* is used to increase the number of ports of the CPU 10, mainly when the number of ports of the CPU 10 is not enough to control the load (hardware device 105). The I/O expander 103*a* serves to transmit a signal from the CPU 10 to the load to be controlled, and using the I/O expander 103*a* makes it possible to control a larger number of loads by a smaller number of CPU 10.

In such case, the control signal for the motor 13 is transmitted to the pre-driver 14 via the I/O expander 103*a*. The pre-driver 14 receives the signal and then transmits a drive signal, which is used for switching each phase of the electric current of the motor 13, to the motor 13.

The clear signal sent to the watchdog timer 102 is transmitted from the CPU 10 via the I/O expander 103*a*. The watchdog timer 102 receives the clear signal transmitted at regular intervals. Receiving a clear signal at a certain period by the watchdog timer 102 indicates that the system (motor driving apparatus 100) operates normally. When the watchdog timer 102 can no longer receive the clear signals, the watchdog timer 102 transmits a reset signal to the CPU 10.

The watchdog timer 102 causes the CPU 10 and the I/O expander 103*a* to be initialized, and transmits a disable signal to the pre-driver 14. The pre-driver 14 that received the disable signal stops sending a control signal to the motor 13, thereby stopping the driving of the motor 13. The ROM 11 and the RAM 12 connected to the CPU 10 record and store the state of the CPU 10 as well as save the states of the CPU 10 and the communication in the case of the occurrence of abnormality.

Specifically, in the configuration illustrated in FIG. 2 described above, the following operation control is performed. The controlling unit 101 outputs a control signal to control the hardware device 105. On the basis of the control signal from the controlling unit 101, a relay unit (I/O expander 103*a*) outputs a control signal to the hardware device 105. The watchdog timer 102 outputs the second signal when not receiving the first signal output from the controlling unit 101 via the relay unit (I/O expander 103*a*) for a predetermined length of time or longer. When the second signal is output, the controlling unit 101 and the I/O expander 103*a* (relay unit) perform initialization process, and the hardware device 105 stops driving.

The AND circuit 104 outputs the fourth signal when receiving the RST (second signal) output from the watchdog timer 102 and the RST_0 (third signal) output from the controlling unit 101. The controlling unit 101 outputs the third signal when receiving the second signal.

The relay unit (I/O expander 103*a*) performs the initialization process when receiving the fourth signal. The hardware device 105 stops driving when receiving the fourth signal.

Figure 3:
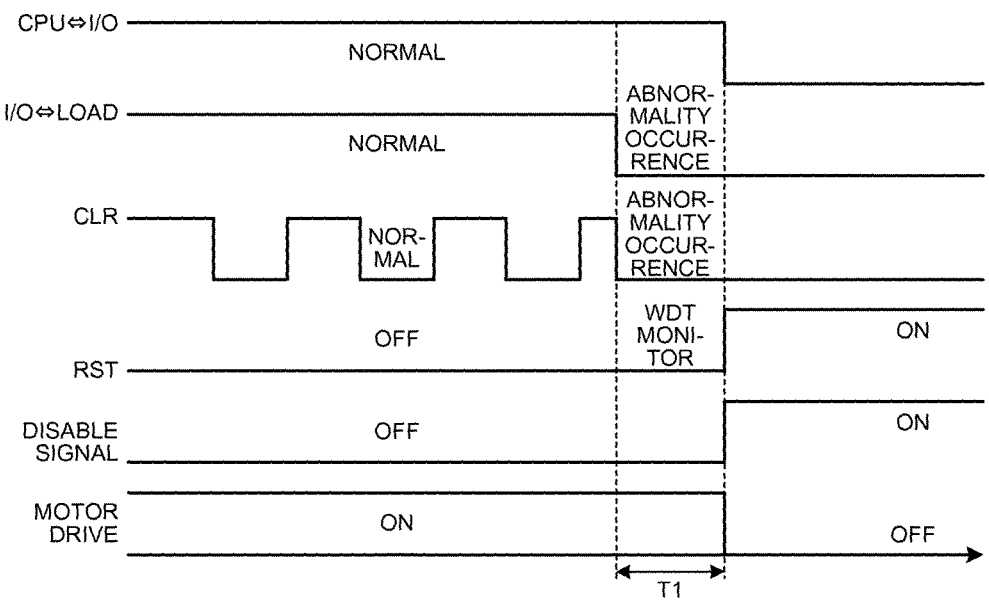
FIG. 3 is a timing chart illustrating a state of a motor driving apparatus according to the embodiment in the case of the occurrence of abnormality.

An operation of the motor driving apparatus 100 will now be described with reference to the timing chart. FIG. 3 is a timing chart illustrating a state of the motor driving apparatus 100 according to the embodiment in the case of the occurrence of abnormality. In FIG. 3, a watchdog timer is abbreviated to WDT, a clear signal is abbreviated to CLR, a reset signal is abbreviated to RST, an I/O expander is abbreviated to I/O, and a hardware device is indicated as a load. In this operation example, for ease of explaining the timing chart of control signals and the like, it is assumed that the signals sent from the I/O expander 103 to the motor 13 are not transmitted normally due to an abnormality among the signals sent from the CPU 10 to the motor 13.

In FIG. 3, first it is presumed that the instruction from the CPU 10 to the I/O expander 103a is transmitted normally. Here, considering a case in which abnormality occurs at the timing of TI as indicated by a signal sent from the I/O expander 103a to the load (hardware device 105) to be controlled in FIG. 3.

When the signal sent from the I/O expander 103a to the load is not transmitted due to the occurrence of abnormality, a clear signal is not transmitted to the watchdog timer 102. Accordingly, the watchdog timer 102 does not receive a clear signal during the period of TI, and thus detects that an abnormality occurs in the system (motor driving apparatus 100).

The watchdog timer 102 that has detected the occurrence of abnormality transmits a reset signal, causes the CPU 10 and the I/O expander 103a to be initialized, and transmits a disable signal to the pre-driver 14. The pre-driver 14 that received the disable signal stops the driving control of the motor 13. In this manner, the driving of the motor 13 is stopped in the case of the occurrence of abnormality. Accordingly, the driving of the motor can be stopped without fail even when an abnormality occurs in the system (motor driving apparatus 100.

As in the conventional system, when an abnormality such as a runaway of software occurs in the CPU 10, a clear signal is not transmitted to the I/O expander 103a at all. Due to this, the watchdog timer 102 cannot receive a clear signal, and thus the driving of the motor 13 can be stopped in the same way as above.

Figure 4:
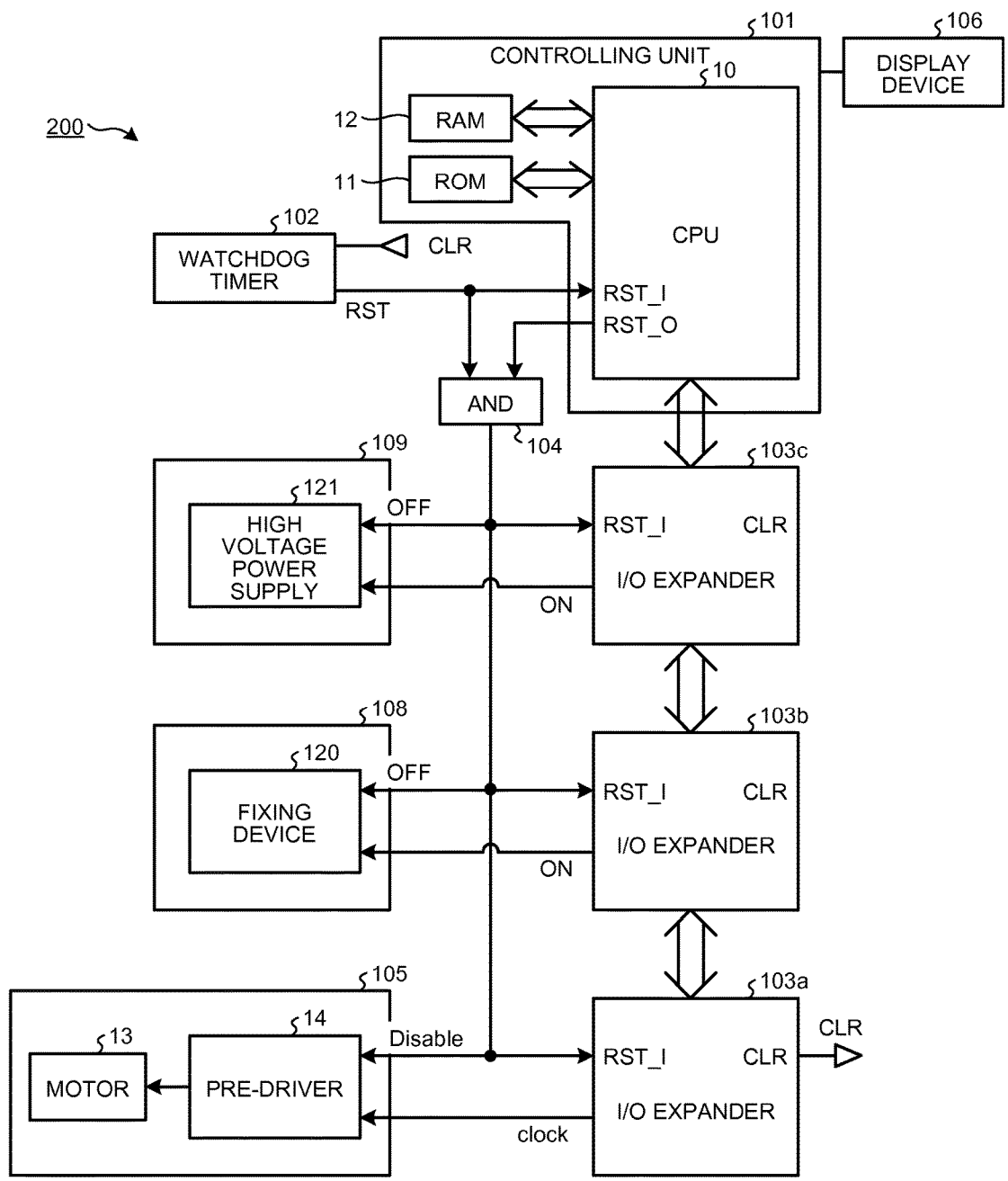
FIG. 4 is a block diagram illustrating an example of an image forming apparatus having a plurality of loads (hardware devices) to be controlled.

In the example of the motor driving apparatus 100 described above, for ease of explanation, only one I/O expander 103a and a load to be controlled thereby are described. Alternatively, as illustrated in FIG. 4, a plurality of loads may be provided respectively corresponding to relay units (I/O expanders). FIG. 4 illustrates a motor driving device 200 that includes a plurality of I/O expanders 103a to 103c and a plurality of loads (hardware devices 105, 108, and 109) to be controlled.

FIG. 4 illustrates an example of an image forming apparatus including a plurality of loads (hardware devices) to be controlled. In FIG. 4, the hardware device 108 includes a fixing device 120 with a fixing heater, and the hardware device 109 includes a high voltage power supply 121 for, for example, charging, transferring, and separating. Such configuration is valid not only to the motor 13 but also to any load that can be controlled by the I/O expanders 103a to 103c.

In FIG. 4, the fixing device 120 may be the fixing unit 53 by a fixing belt method including a fixing roller and a pressure roller having a fixing heater therein as illustrated in FIG. 1, or may be a generally known fixing device configured by a pair of a fixing roller and a pressure roller. As illustrated in FIG. 1, for example, the high voltage power supply 121 is used to apply high voltage to the surface of the respective photoconductor drums 74 by a charger and the like. The high voltage power supply 121 for transferring and separating, for example, is a power supply used to apply a certain voltage so as to bring an image onto the intermediate transfer belt 54 in close contact with a recording paper sheet, and to transfer and separate the image.

As illustrated in FIG. 4, the controlling unit 101 is connected to the plurality of relay units (I/O expanders 103a to 103c) that output control signals to the hardware devices 105, 108 and 109, which are different from each other. The watchdog timer 102 receives a clear signal output from the I/O expander 103a among the relay units (I/O expanders 103a to 103c) at regular intervals.

In FIG. 4, the controlling unit 101 receives a clear signal output from the relay units at regular intervals through the watchdog timer 102. The controlling unit 101 then compares the received clear signal with a signal that is predetermined to each relay unit to specify in which relay unit (I/O expanders 103a, 103b or 103c) an abnormality occurs.

The controlling unit 101, when an abnormality is detected by the watchdog timer 102, performs a certain display on the display device 106. In this case, the controlling unit 101 may display a message such as "Abnormality has been detected in XXX unit" on the display device 106.

As described above, the configuration illustrated in FIG. 4 includes a plurality of relay units (I/O expanders 103a to 103c) that output control signals to their respective hardware devices 105, 108 and 109 that are different from each other. The controlling unit 101 and the relay units (I/O expanders 103a to 103c) are connected in series. To the watchdog timer 102, a CLR (first signal) is output from the relay unit (I/O expander 103a) that is furthest from the controlling unit 101 in the series connection.

In the conventional configuration, the CPU sends a clear signal, and thus the abnormality of control signals of units subsequent to the CPU could not be detected, and this can cause a plurality of loads to continue operating abnormally. In contrast, in FIG. 4, the CPU 10 transmits a clear signal to the watchdog timer 102 via the control system up to the end. This configuration enables the load to stop safely if an abnormality occurs at any portion of communications between the CPU 10 and the I/O expanders 103a to 103c, and among the I/O expanders 103a to 103c.

In FIG. 4, a clear signal is transmitted only from the I/O expander 103a that is located at the end. Alternatively, all the I/O expanders 103a to 103c may have a function of transmitting clear signals, and the clear signals are transmitted to the watchdog timer 102 via the CPU 10. This also makes it possible to detect where an abnormality occurs.

The controlling unit 101 may include a main controlling unit and a sub-controlling unit. In this case, the main controlling unit and the sub-controlling unit are connected to the relay units (I/O expanders 103a to 103c) that output control signals to the hardware devices 105, 108, and 109, which are different from each other. The watchdog timer 102 monitors clear signals output from the relay units at regular intervals.

As has been described above, the embodiment provides the following advantageous effects in a device that drives and controls a load, such as the motor 13. That is, the present embodiment enables a simple circuit configuration not only to monitor a runaway of software in the CPU 10 but also to detect an abnormality occurred between the CPU 10 and the I/O expanders 103a to 103c in addition to a runaway of software, and then forcibly stops the load such as the motor 13 so as to protect the apparatus.

The computer program executed in the present embodiment is built into the ROM 11 in advance, but it is not limited thereto. Alternatively, the computer program executed in the present embodiment may be recorded on a computer-readable recording medium and provided as a computer program product. For example, the computer program may be provided by being recorded in a computer-readable recording medium such as a compact disc-read-only memory (CD-ROM), a flexible disc (FD), a compact disc recordable (CD-R), or a digital versatile disc (DVD), in a file of an installable format or an executable format.

The computer program executed in the present embodiment may be stored in a computer connected to a network such as the Internet and be downloaded via the network so as to be provided. The computer program executed in the present embodiment may be provided or distributed via a network such as the Internet.

The computer program in the ROM 11 executed in the present embodiment has a module configuration including the functions of the CPU 10 described above. As an actual hardware, the CPU 10 (processor) reads the computer program from the recording medium described above and executes it, whereby each unit described above is loaded on a main storage such as the RAM 12. Accordingly, the computer program described above is generated on the main storage.

The invention made by the present inventors has been described in detail based on the preferred embodiment. However, it is to be understood that the present invention is not limited to those described in the above embodiment, and various modifications may be made without departing from the spirit and scope thereof. In the embodiment described above, the image forming apparatus 1, which is configured as an intermediate transfer tandem color copying machine, was used as an example of an image forming apparatus to which the present invention may be applied. However, the present invention may be applied widely to any type of image forming apparatus. The present invention may be widely applied not only to image forming apparatuses but also to apparatuses including a motor that is required to rotate at a constant speed. Furthermore, the present invention may be widely applied not only to motors but also to hardware devices connected to a controlling unit via relay units such as I/O expanders.

The present invention provides advantageous effects of accurately monitoring an abnormality in a relay unit connected to a controlling unit and accurately stopping a hardware device in the case of the occurrence of abnormality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hardware device controller comprising:
   a controlling unit configured to output a control signal to control a hardware device;
   a relay unit configured to output, on the basis of the control signal, a control signal to the hardware device; and
   a watchdog timer configured to, when not receiving a first signal output from the controlling unit via the relay unit for a predetermined length of time or longer, output a second signal, wherein when the second signal is output, the controlling unit and the relay unit perform initialization process, and the hardware device stops driving.

2. The hardware device controller according to claim 1, further comprising:
   a circuit configured to output a fourth signal when receiving the second signal and a third signal output from the controlling unit, wherein
   the controlling unit is configured to output the third signal when receiving the second signal.

3. The hardware device controller according to claim 2, wherein
   the relay unit performs initialization process when receiving the fourth signal, and
   the hardware device stops driving when receiving the fourth signal.

4. The hardware device controller according to claim 1, further comprising:
   a plurality of relay units that to respectively output control signals to a plurality of hardware devices different from each other, wherein
   the controlling unit and the plurality of relay units are connected in series, and
   to the watchdog timer, the first signal is output from one of the plurality of relay units that is relatively furthest from the controlling unit in the series connection.

5. The hardware device controller according to claim 1, further comprising a display unit, wherein
   when an abnormality is detected by the watchdog timer, the controlling unit performs a certain display on the display unit.

6. An image forming apparatus comprising:
   a hardware device controller including
      a controlling unit configured to output a control signal to control a hardware device,
      a relay unit configured to output, on the basis of the control signal, a control signal to the hardware device, and
      a watchdog timer configured to, when not receiving a first signal output from the controlling unit via the relay unit for a predetermined length of time or longer, output a second signal, wherein when the second signal is output, the controlling unit and the relay unit perform initialization process, and the hardware device stops driving; and
   a forming unit configured to form image information to be printed on a recording sheet.

7. The image forming apparatus according to claim 6, wherein the hardware device controller further comprises:
   a circuit configured to output a fourth signal when receiving the second signal and a third signal output from the controlling unit, wherein the controlling unit is configured to output the third signal when receiving the second signal.

8. The image forming apparatus according to claim 7, wherein the relay unit performs initialization process when receiving the fourth signal, and the hardware device stops driving when receiving the fourth signal.

9. The image forming apparatus according to claim 6, wherein the hardware device controller further comprises:
   a plurality of relay units to respectively output control signals to a plurality of hardware devices different from each other, wherein
   the controlling unit and the plurality of relay units are connected in series, and to the watchdog timer, the first signal is output from one of the plurality of relay units that is relatively furthest from the controlling unit in the series connection.

10. The image forming apparatus according to claim 6, further comprising a display unit, wherein when an abnormality is detected by the watchdog timer, the controlling unit performs a display on the display unit.

11. A control method for controlling a hardware device controller, the hardware device controller including:
   a controlling unit configured to output a control signal to control a hardware device,
   a relay unit configured to, on the basis of the control signal, output a control signal to the hardware device, and
   a watchdog timer configured to, when not receiving a first signal output from the controlling unit via the relay unit for a predetermined length of time or longer, output a second signal,
the control method comprising:
when the second signal is output,
   performing initialization process by the controlling unit and the relay unit,
   performing initialization process by the relay unit, and stopping driving of the hardware device.

12. The method of claim 11, further comprising:
   outputting a fourth signal when receiving the second signal and a third signal output from the controlling unit, the third signal being output when receiving the second signal.

13. The method of claim 12, wherein an initialization process is performed when receiving the fourth signal, and the stopping of the driving includes stopping the driving when receiving the fourth signal.

14. The method of claim 11, wherein the hardware device controller further comprises a display unit, the method further comprising:
   performing, when an abnormality is detected by the watchdog timer, a display on the display unit.

15. The method of claim 11, further comprising:
   performing, when an abnormality is detected by the watchdog timer, a display on a display unit.

* * * * *